United States Patent [19]
Vecchione

[11] Patent Number: 5,333,245
[45] Date of Patent: Jul. 26, 1994

[54] METHOD AND APPARATUS FOR MAPPING SURFACE TEXTURE

[75] Inventor: Maurizio Vecchione, Encino, Calif.

[73] Assignee: Modacad, Inc., Los Angeles, Calif.

[21] Appl. No.: 166,266

[22] Filed: Dec. 10, 1993

Related U.S. Application Data

[63] Continuation of Ser. No. 579,884, Sep. 7, 1990, abandoned.

[51] Int. Cl.$^5$ .............................................. G06F 15/20
[52] U.S. Cl. ...................................... 395/130; 395/129
[58] Field of Search ................ 395/118, 119, 120, 121, 395/122, 123, 125, 127, 129–132

[56] References Cited

U.S. PATENT DOCUMENTS

4,888,713 12/1989 Falk ...................................... 395/125
5,107,444 4/1992 Wu ...................................... 395/119

Primary Examiner—Gary V. Harkcom
Assistant Examiner—Huynh Ba
Attorney, Agent, or Firm—Blakely, Sokoloff, Taylor & Zafman

[57] ABSTRACT

A two- or three-dimensional image of an object is first input into a computer system. An operator may then define one or more regions of the image for application of surface texture. A two-dimensional image of a surface texture is also input into the computer system. A polygonal area or patch, such as a rectangle, of the surface texture is then defined by the operator. A corresponding patch on the object image, which need not have the same shape or orientation as the patch on the texture image, is also defined by the operator. The patches on the texture image and on the object image need not be contiguous, adjacent or uniform. The object patch is assumed to be a perspective view of the corresponding texture patch, and a three-dimensional mapping function from the texture patch to the object patch is calculated. The spatial position of points on the defined region of the object image that are between the patches are interpolated and smoothed so that a complete three-dimensional mathematical model of a surface corresponding to the defined region is calculated. The process of defining polygonal patches on the texture image and corresponding patches on the object image is repeated until the operator is satisfied that the defined region of the object image is adequately modelled. Conventional texture mapping algorithms are then used to fill the defined region of the object image with texture.

13 Claims, 4 Drawing Sheets

METHOD AND APPARATUS FOR MAPPING SURFACE TEXTURE

This is a continuation of application Ser. No. 07/579,884 filed Sep. 7, 1990, now abandoned.

BACKGROUND OF THE INVENTION

1. Field of the Invention

This invention pertains to the related fields of computer aided design (CAD) and computer graphics. More specifically, this invention relates to an improved system for mapping surface texture onto a computer rendered image of a three-dimensional object.

2. Background Description

One of the objectives of computer aided design systems is the realistic rendering of an image of a three-dimensional object. By imparting greater realism to computer generated images, a designer is better able to visualize the three-dimensional structure and appearance of an object without actually constructing a physical prototype. One technique for enhancing the realism of a computer generated image is the application of surface "texture" onto the image. In this context, "texture" refers to local surface detail that may comprise surface roughness, graphic patterns and the like.

Various techniques for texture mapping are well known in the field of computer graphics. In "Computer Display of Curved Surfaces", Proceedings of IEEE Conference on Computer Graphics, Pattern Recognition and Data Structure, May 1975, pp. 11–17, Edwin Catmull described a technique for modelling a three-dimensional surface using bicubic patches. The patches are recursively subdivided until no subpatch contains more than a single display pixel. The subpatch is then approximated as a quadrilateral, allowing a simple linear transformation to be used for mapping from texture coordinates to image coordinates. Extensions of Catmull's basic technique were described by James F. Blinn and Martin E. Newell in "Texture and Reflection in Computer Generated Images", Communications of the ACM, October 1976, pp. 542–547.

A field in which visualization of objects with applied surface texture is particularly important is fashion design. A number of systems have been developed that allow a fashion designer to apply different fabric textures and patterns onto a computer generated image of a garment. Such systems permit the designer to visualize a garment made from the selected fabric in a realistic manner, including the distortions naturally introduced by the drapes and folds of fabric as it would appear on an actual three-dimensional garment. A system of this type is described in U.S. Pat. No. 4,888,713 issued to Falk. In this particular system, an operator applies an orthogonal mesh to an image of a garment and, using a variety of CAD tools, distorts the mesh so that the mesh appears to have the proper perspective, including wrinkles and folds of the fabric. Texture is then applied using conventional mapping techniques such as described in the above-referenced articles. Such a system produces acceptable results, but requires substantial operator time to make all the necessary adjustments to the mesh so that a realistic image results. Furthermore, the system operates strictly in two dimensions so that no information about the three-dimensional topology of the object is derived. Consequently, the system described by Falk cannot be used to alter the illumination and shadowing of a garment or its orientation with respect to the operator.

The present invention provides an improved method for adding surface texture to a two-dimensional image of a three-dimensional object such that operator time is substantially decreased and such that the object is mathematically modelled in three dimensions.

SUMMARY OF THE INVENTION

A two- or three-dimensional image of an object is first input into a computer system by way of a scanner, video camera or other device, or such an image may be drawn by an operator using conventional CAD software. The operator may then define one or more regions of the image for application of surface texture.

A two-dimensional image of a surface texture, such as a fabric pattern, is also input into the computer system. A polygonal area or patch, such as a rectangle, of the surface texture is then defined by the operator. A corresponding patch on the object image, which need not have the same shape or orientation as the patch on the texture image, is also defined by the operator. It is assumed that the patch on the texture image is two-dimensional, but that the corresponding patch on the object image is a two-dimensional projection of a three-dimensional surface. Although only the two-dimensional coordinates of the object image patch are entered by the user, the three-dimensional surface direction may be calculated from the two-dimensional coordinates with the aid of a "tilt hint".

The process of defining polygonal patches on the texture image and corresponding patches on the object image is repeated until the operator is satisfied that the defined region of the object image is adequately modelled. The patches on the texture image and on the object image need not be contiguous, adjacent or uniform.

The relative distortion between a patch on the object image and the corresponding patch on the texture image, together with the "tilt hint", is used to infer the three-dimensional orientation of the object patch. That is, the object patch is assumed to be a perspective view of the corresponding texture patch, and a three-dimensional mapping function from the texture patch to the object patch is calculated.

The spatial position of points on the defined region of the object image that are between the patches are interpolated and smoothed so that a complete three-dimensional mathematical model of a surface corresponding to the defined region is calculated. Conventional texture mapping algorithms are then used to fill the defined region of the object image with texture so that the texture is displayed with the proper perspective as if "draped" onto the underlying surface.

A defined region of the object image may be "flattened" into a two-dimensional panel and viewed with texture overlaid. The relative position, scale and orientation of the flattened panel and the texture pattern may be adjusted by the operator to achieve a more pleasing result.

In addition to applying surface texture onto the object image, the three-dimensional mathematical model facilitates the computation of lighting normals and shading so that a fully textured and illuminated surface may be displayed to the operator. With suitable software, the three-dimensional model also allows the operator to rotate the object image so that it may be viewed from different angles.

DETAILED DESCRIPTION OF THE INVENTION

In the following description, for purposes of explanation and not limitation, specific numbers, algorithms, computer implementations, etc. are set forth in order to provide a thorough understanding of the present invention. However, it will be apparent to one skilled in the art that the present invention may be practiced in other embodiments that depart from these specific details. In other instances, detailed descriptions of well-known graphics processing equipment and techniques are omitted so as not to obscure the description of the present invention with unnecessary detail.

Figure 1:
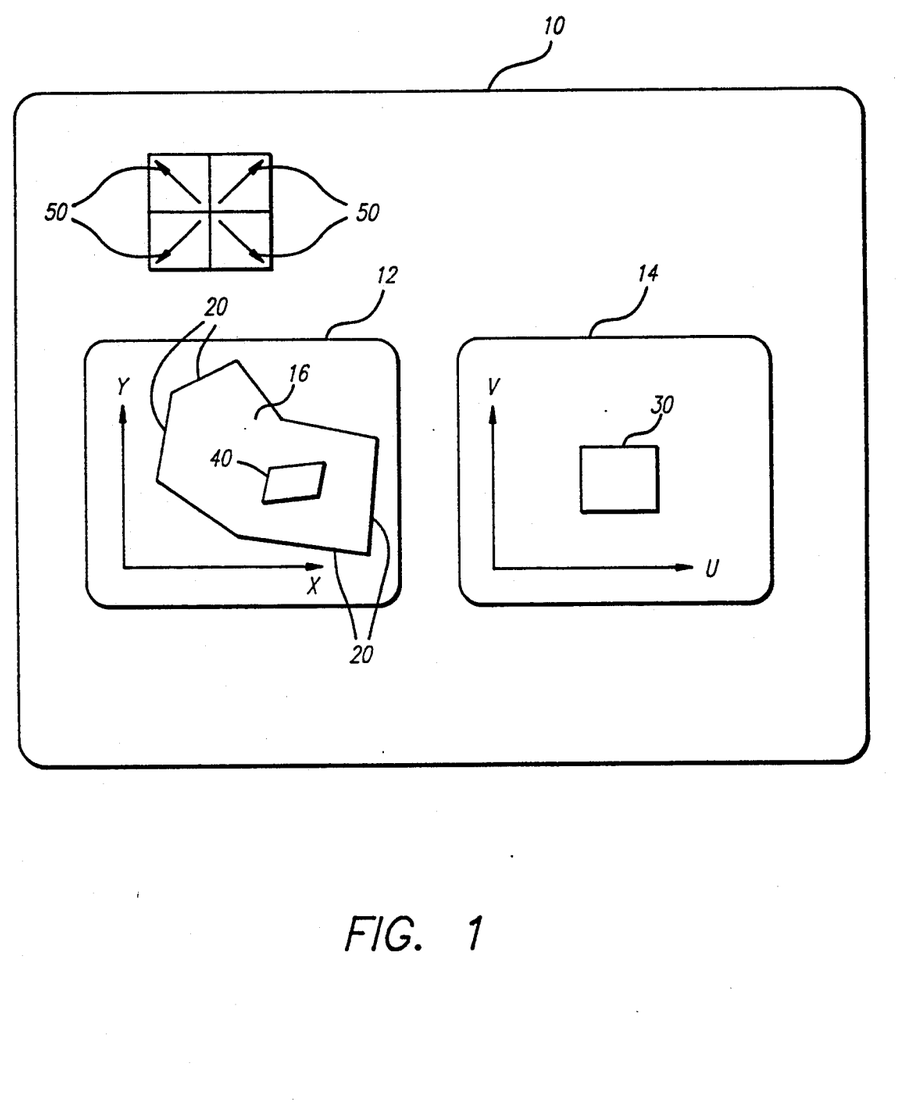
FIG. 1 is a diagrammatic view of a computer screen for implementing the described invention.

FIG. 1 illustrates a computer display screen 10 for providing an operator interface in connection with the method of the present invention. A functional flow diagram of the major steps of this method is presented in FIG. 2. The present invention may be implemented on any computer system capable of supporting conventional high resolution graphics processing, such as a "Macintosh" manufactured by Apple Computers, Inc.

Initially, a two- or three-dimensional graphic image of an object is input into the computer system. This step may be accomplished from an actual object or photograph thereof by the use of a conventional digital image scanner, a digitizing video camera or other electronic means. Alternatively, an image of an object may be drawn by an operator using any suitable conventional CAD software, paint program or the like. Within screen 10 are two smaller screens or windows 12 and 14. The two-dimensional graphic image of the object previously input to the computer system is displayed to the operator on screen 12 at step 100 of FIG. 2. Screen 12 is sometimes conveniently referred to herein as the "canvas" screen or window.

Screen 14 provides to the operator a two-dimensional "flat" image of the texture itself (step 104). The texture image is input to the computer system in the same manner as the object image. In many applications, it is convenient to maintain a library of standard textures. In the particular application described herein, the texture generally comprises a patterned or textured fabric to be "draped" onto the object appearing in screen 12, and consequently screen 14 is sometimes conveniently referred to herein as the "fabric" screen or window.

Figure 2:
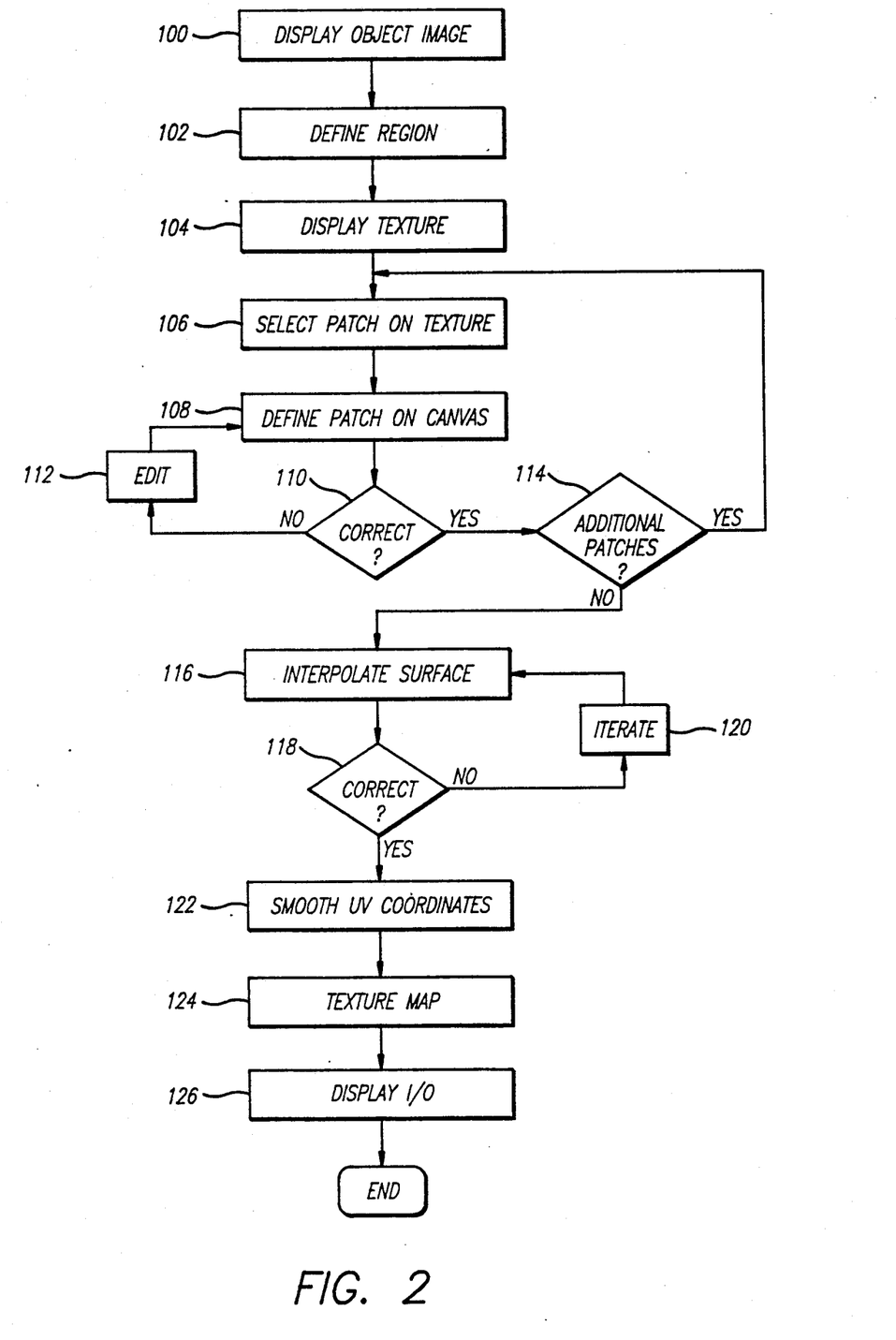
FIG. 2 is a functional flow diagram of the method of the present invention.

At step 102, the operator initially defines a region 16 on the object image in the canvas window by means of a plurality of bounding polylines 20. Polylines 20 are designated by the operator using a graphic input device such as a mouse and conventional CAD tools as are well known in the art. At step 106 the operator next defines a "patch" 30 on the fabric window. In the described embodiment, patch 30 is a rectangle; however, with suitable modifications to the calculations described below, any polygonal area of the fabric may be designated as a patch. Again, conventional CAD tools are employed for designating patch 30. By constraining patch 30 to be rectangular, it should be noted that only two diagonally opposite vertices need be designated by the operator to fully define the patch.

The operator then defines a corresponding patch 40 on the canvas window at step 108. Patch 40 must have the same number of bounding polylines as patch 30 (four in the described embodiment), but is otherwise unconstrained in size, shape and orientation. By altering the size, shape and orientation of patch 40 in comparison to that of patch 30, the operator imparts perspective and depth information. Using conventional CAD tools, the operator edits the size, shape and orientation of patch 40 in step 112 until it has the desired appearance. In this manner, the operator "draws" patch 40 on the canvas screen so that it has the desired appearance of a projection of patch 30 applied to the surface represented by object region 16.

It will be noted that perspective patch 40 is inherently ambiguous with respect to the direction that it tilts, i.e., the surface normal could be pointing either up or down. To resolve this ambiguity, the operator inputs a "tilt hint" by designating the general direction of the surface normal of patch 40. This is accomplished by designating one of the four arrow symbols 50 displayed on display screen 10.

Defining a patch on the fabric screen and a corresponding patch on the canvas screen provides a mapping specification from the coordinate system of the fabric screen to the coordinate system of the canvas screen. While the canvas screen may be simply defined in two dimensions, the full advantages of the present invention are realized by defining the canvas patches in three dimensions.

Figure 4A:
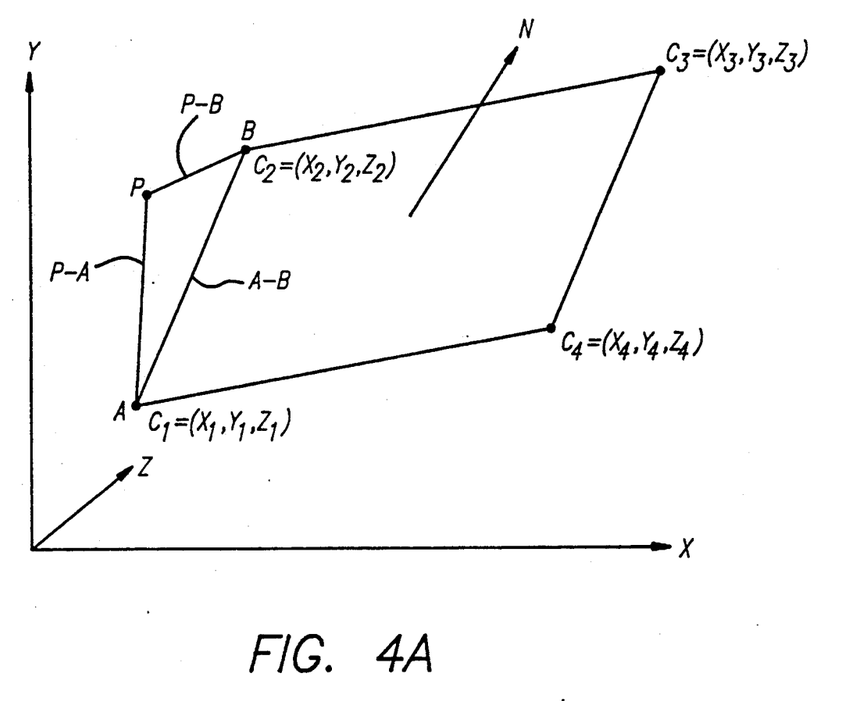
FIG. 4a is a graphical representation of the canvas window patch shown in FIG. 1.
Figure 4B:
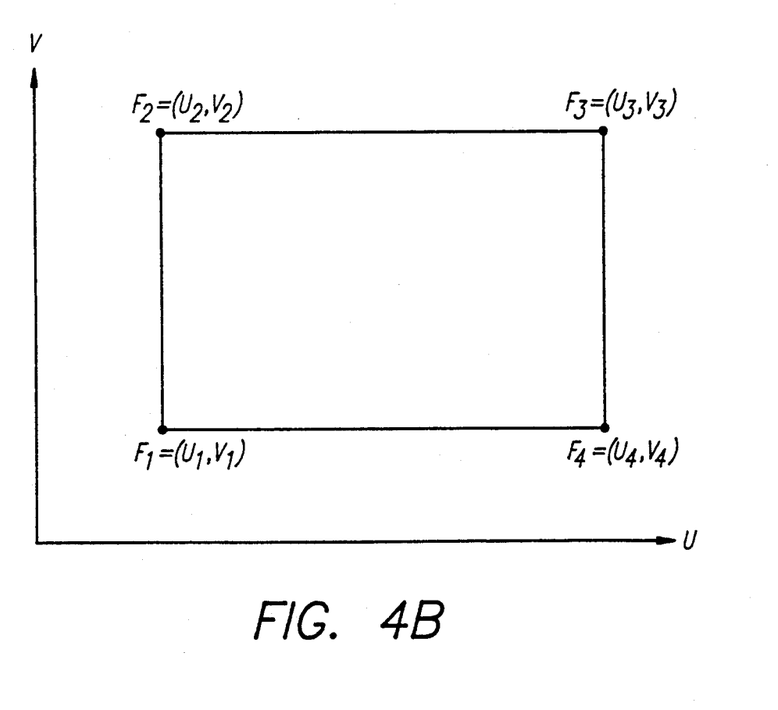
FIG. 4b is a graphical representation of the fabric window patch shown in FIG. 1.

With reference to FIGS. 4a and 4b, the computational steps used to calculate a three-dimensional model of the object depicted in the canvas window will now be described. Coordinates in the fabric window 14 are represented by U (horizontal) and V (vertical), whereas coordinates in the canvas window 12 are represented by X (horizontal) and Y (vertical). In the following equations, scalar quantities are indicated by normal text, whereas vector quantities (points) are indicated by bold text. A line segment or patch edge is represented by the subtraction of the two end-points: "[A−B]". Scalar multiplication is indicated with an asterisk: "*", a dot "." indicates a vector dot-product, and "x" is a vector cross-product. Vertical bars indicate absolute value of scalars: "|W|", and vector magnitude (distance) for vectors: "|A−B|".

A patch in the fabric window is fully defined by its vertices $(X_n, Y_n)$, and the corresponding patch in the canvas window is defined by its vertices $(U_n, V_n)$. In each case, $n = 1$ to 4. For each of the vertices in clockwise order, the following partial derivatives are computed:

$$(\partial U/\partial X)_n = \{(U_n - U_{n-1})*(Y_{n+1} - Y_n) - (U_{n+1} - U_n)*(Y_n - Y_{n-1})\}/\{(X_n - X_{n-1})*(Y_{n+1} - Y_n) - (X_{n+1} - X_n)*(Y_n - Y_{n-1})\}$$

$$(\partial U/\partial Y)_n = \{(X_n - X_{n-1})*(U_{n+1} - U_n) - (X_{n+1} - X_n)*(U_n - U_{n-1})\}/\{(X_n - X_{n-1})*(Y_{n+1} - Y_n) - (X_{n+1} - X_n)*(Y_n - Y_{n-1})\}$$

$$(\partial V/\partial X)_n = \{(V_n - V_{n-1})*(Y_{n+1} - Y_n) - (V_{n+1} - V_n)*(Y_n - Y_{n-1})\}/\{(X_n - X_{n-1})*(Y_{n+1} - Y_n) - (X_{n+1} - X_n)*(Y_n - Y_{n-1})\}$$

$$(\partial V/\partial Y)_n = \{(X_n - X_{n-1})*(V_{n+1} - V_n) - (X_{n+1} - X_n)*(V_n - V_{n-1})\}/\{(X_n - X_{n-1})*(Y_{n+1} - Y_n) - (X_{n+1} - X_n)*(Y_n - Y_{n-1})\}$$

Next, translation offsets are computed for each vertex:

$$BU_n = U_n - (\partial U/\partial X)_n * X_n - (\partial U/\partial Y)_n * Y_n \qquad (5)$$

$$BV_n = V_n - (\partial V/\partial X)_n * X_n - (\partial V/\partial Y)_n * Y_n \qquad (6)$$

Thus defining a linear mapping fit for each vertex of the form:

$$u = BU_n + (\partial U/\partial X)_n * x + (\partial U/\partial Y)_n * y \qquad (7)$$

$$v = BV_n + (\partial V/\partial X)_n * x + (\partial V/\partial Y)_n * y \qquad (8)$$

Canvas patch normals are computed at each vertex. It is assumed that the canvas patch as entered by the operator is a two-dimensional orthographic projection of a three-dimensional patch that has the same shape as the fabric patch. As discussed above, fabric patches are restricted to rectangles when entered. Mathematically, this is expressed in equations (9) and (10) below; where $C_n$ is a canvas patch vertex with coordinates $(X_n, Y_n, Z_n)$, and $F_n$ is the corresponding fabric patch vertex with coordinates $(U_n, V_n)$. Note that a depth coordinate, $Z_n$, is introduced to fully define the canvas patch in three dimensions.

Since the canvas patch is a projection of the rectangular fabric patch, adjacent edges of the canvas patch, when expressed in three-dimensional coordinates, are perpendicular:

$$[C_{n+1} - C_n] \cdot [C_n - C_{n-1}] = 0 \qquad (9)$$

Adjacent edge lengths are in the same ratio between canvas and fabric:

$$|C_n - C_{n-1}|/|C_{n+1} - C_n| = |F_n - F_{n-1}|/|F_{n+1} - F_n| \qquad (10)$$

Solving equations (9) and (10) simultaneously for the unknown Z adjacent-edge values yields:

$$a*(Z_{n+1} - Z_n)^4 + b*(Z_{n+1} - Z_n)^2 - c = 0 \qquad (11)$$

$$-(Z_n - Z_{n-1})^4 + b*(Z_n - Z_{n-1})^2 - a*c = 0 \qquad (12)$$

where:

$$a_n = |F_n - F_{n-1}|^2 / |F_{n+1} - F_n|^2 \qquad (13)$$

$$b_n = a_n * \{(X_{n+1} - X_n)^2 + (Y_{n+1} - Y_n)^2\} - (X_n - X_{n-1})^2 - (Y_n - Y_{n-1})^2 \qquad (14)$$

$$c_n = \{(X_{n+1} - X_n)*(X_n - X_{n-1}) + (Y_{n+1} - Y_n)*(Y_n - Y_{n-1})\}^2 \qquad (15)$$

By use of the quadratic formula to solve (11) and (12):

$$Z_{n+1} - Z_n = \pm \sqrt{(-b + \sqrt{b^2 + 4*a*c})/2*a} \qquad (16)$$

$$Z_n - Z_{n-1} = \pm \sqrt{(-b - \sqrt{b^2 + 4*a*c})/(-2)} \qquad (17)$$

The signs of the square roots in equations (16) and (17) are adjusted to make the surface normal have the same direction as the tilt hint while also preserving equation (9). Canvas normals are calculated by taking the cross-product of the vertex adjacent edges, including the Z component:

$$N_n = ([C_n - C_{n-1}] \times [C_{n+1} - C_n])/|[C_n - C_{n-1}] \times [C_{n+1} - C_n]| \qquad (18)$$

Generally, a number of patches will need to be defined to adequately model the surface features of region 16. If region 16 is relatively smooth, one or two patches may be sufficient. However, if region 16 is to be depicted as having numerous wrinkles or folds, a larger number of patches will be required. At step 114, the operator determines whether or not additional patches are to be designated. As each patch is defined, an interpolation process is performed at step 116 to derive coordinate values for all points on the canvas, both inside and outside of the defined patches.

A general interpolation technique is used to calculate various values at canvas sample points from a weighted average of the values at all of the contributing patches. It is easier to describe the weighting in terms of patch edges rather than in terms of vertices:

$$\text{value}_{interpolated} = \left( \sum_{edges} \text{value}_{edge} * \text{weight}_{edge} \right) / \sum_{edges} \text{weight}_{edge} \qquad (19)$$

Given a two-dimensional canvas sample point P and a patch edge between canvas points A and B, the weighting is simply the inverse elliptic distance, while the value is a simple proportion of the vertex values based on distance:

$$\text{weight}_{edge} = 1/(|P-A| + |P-B| - |A-B|) \qquad (20)$$

$$\text{value}_{edge} = (\text{value}_A * |P-B| + \text{value}_B * |P-A|)/(|P-A| + |P-B|) \qquad (21)$$

This interpolation is used to calculate the four partial derivatives at every sample point; and the normal at every sample point by interpolation of each component (X,Y,Z) independently, then renormalizing. In both of these cases, every patch edge participates.

Initial values for U and V are calculated at each sample point. For sample points that are inside a patch, the interpolation described by equations (19), (20) and (21) is applied to the linear fit values of equations (7) and (8) for the four vertices of the containing patch. For sample points not inside any patch, the interpolation described by equation (21) is applied to the linear fit values of equations (7) and (8) for the patch edge that is nearest to the sample point. The distance from the sample point P to the patch edge [A−B] may either be calculated as the elliptic distance:

$$\text{distance} = |P-A| + |P-B| - |A-B| \qquad (22)$$

or better results may be obtained by taking into account the edge derivatives:

$$(\partial U/\partial X) = ((\partial U/\partial X)_A * |P-B| + (\partial U/\partial X)_B * |P-A|)/(|P-A|+|P-B|) \quad (23)$$

(24-26) similarly for $(\partial U/\partial Y)$, $(\partial V/\partial X)$, and $(\partial V/\partial Y)$ so that:

$$\text{distance} = \sqrt{((\partial U/\partial X)*(X_P - X_A) + (\partial U/\partial Y)*(Y_P - Y_A))^2 + ((\partial V/\partial X)*(X_P - X_A) + (\partial V/\partial Y)*(Y_P - Y_A))} \quad (27)$$
$$+ \sqrt{((\partial U/\partial X)*(X_P - X_B) + (\partial U/\partial Y)*(Y_P - Y_B))^2 + ((\partial V/\partial X)*(X_P - X_B) + (\partial V/\partial Y)*(Y_P - Y_B))}$$
$$- \sqrt{((\partial U/\partial X)*(X_A - X_B) + (\partial U/\partial Y)*(Y_A - Y_B))^2 + ((\partial V/\partial X)*(X_A - X_B) + (\partial V/\partial Y)*(Y_A - Y_B))}$$

An iterative technique is used at step 122 to smooth the (U,V) values at each sample point from the initial values to the final values. The number of smoothing iterations performed depends on a convergence test. Convergence is assumed when the maximum change in either U or V is less than a predetermined value, which is set by the operator.

On each iteration, a new value for U and a new value for V is computed at each sample point from its four neighboring sample points: left, right, top, bottom. At the boundaries, where a sample point is missing one or two neighbors, the missing neighbor is substituted by an extrapolation based on the appropriate partial derivative:

$$\text{value}_{neighbor} = \text{value}_{sample}*(1+(\partial(\text{value})/\partial(\text{neighbor-direction}))) \quad (28)$$

where value is either U or V and neighbor-direction is either $\pm X$ or $\pm Y$.

U and V values of sample points that are inside patches are not iterated, but are allowed to participate as neighbors of sample points outside.

In order to promote smoothing at patch edge boundaries, a constraint is applied by weighting together the neighbor-iterated values with the original initial values:

$$\text{value}_{new} = \text{value}_{iterated}*(1-\text{weight}) + \text{value}_{initial}*\text{weight}$$

where the weight is calculated according to equations (30) through (33) below.

The perpendicular distance from the sample point P to the nearest patch edge [A−B] is calculated as:

$$\text{distance} = ([P-A]\cdot[B-A])/|B-A| \quad (30)$$

The constraint "RolloffSteepness" and the distance at which this constraint drops to zero are set by the operator:

$$w = \text{distance}*\text{RolloffSteepness}/\text{RolloffMaxDistance} \quad (31)$$

If the distance is less than the RolloffMaxDistance:

$$\text{weight} = 1/(1+w) - 1/(1+\text{RolloffSteepness}) \quad (32)$$

otherwise:

$$\text{weight} = 0 \quad (33)$$

Other rolloff functions could be used, particularly when a patch is small and positioned such that no sample points fall within it. Under some circumstances, it might be desirable to allow partially-constrained iteration for some distance past the edge inside the patch.

The actual smoothing iteration is based on minimizing the LaPlace energy integral:

$$\text{Energy} = \int_{\text{surface}} (\partial U/\partial X)^2 + (\partial U/\partial Y)^2 + (\partial V/\partial X)^2 + (\partial V/\partial Y)^2 \quad (34)$$

Applying the calculus of variation and conversion from continuous to discrete yields the iterative formula to apply independently to U and V at each sample point:

$$\text{value}_{new} = (1/4) * \sum_{\text{neighbors}} \text{value}_{neighbor} \quad (35)$$

A Poisson energy equation was investigated for the smoothing process, but was found to produce inferior results in comparison to the LaPlace equation. The following energy integral produced slightly better results, but not enough to justify the additional computation:

$$\text{Energy} = \int_{\text{surface}} \{((\partial U/\partial X)_{interpolated} - (\partial U/\partial X)_{actual})/|\nabla P|^K\}^2 + \quad (36)$$
$$\{((\partial U/\partial Y)_{interpolated} - (\partial U/\partial Y)_{actual})/|\nabla P|^K\}^2 +$$
$$\{((\partial V/\partial X)_{interpolated} - (\partial V/\partial X)_{actual})/|\nabla P|^K\}^2 +$$
$$\{((\partial V/\partial Y)_{interpolated} - (\partial V/\partial Y)_{actual})/|\nabla P|^K\}^2$$

where the magnitude of the gradient is:

$$|\nabla P| = \sqrt{((\partial U/\partial X)_{interpolated})^2 + ((\partial V/\partial Y)_{interpolated})^2} \quad (37)$$

Because of computational intensity, it is preferable to not perform interpolation and smoothing at every pixel. Instead, a sampling technique is used. Only every N-th pixel participates in the interpolation and smoothing. Then a simple bi-linear interpolation is used to derive each pixel's values from its four circumscribing sample points. The sampling size, N, can be adjusted by the user to achieve a balance between detail accuracy and computation time.

Once final U and V values have been smoothed at all sample points, each square defined by the four sample points at its corners is texture-mapped at step 124. A simple bi-linear interpolation is used to compute the (U,V) and partial derivatives at each pixel from the four sample point values as required to perform conventional texture-mapping. Surface normals are also linearly interpolated from the four sample points to perform lighting calculations at each pixel. In addition, conventional part-edge clipping is performed with optional anti-aliasing. The textured and shaded object image is then displayed to the operator at step 126.

Figure 3:
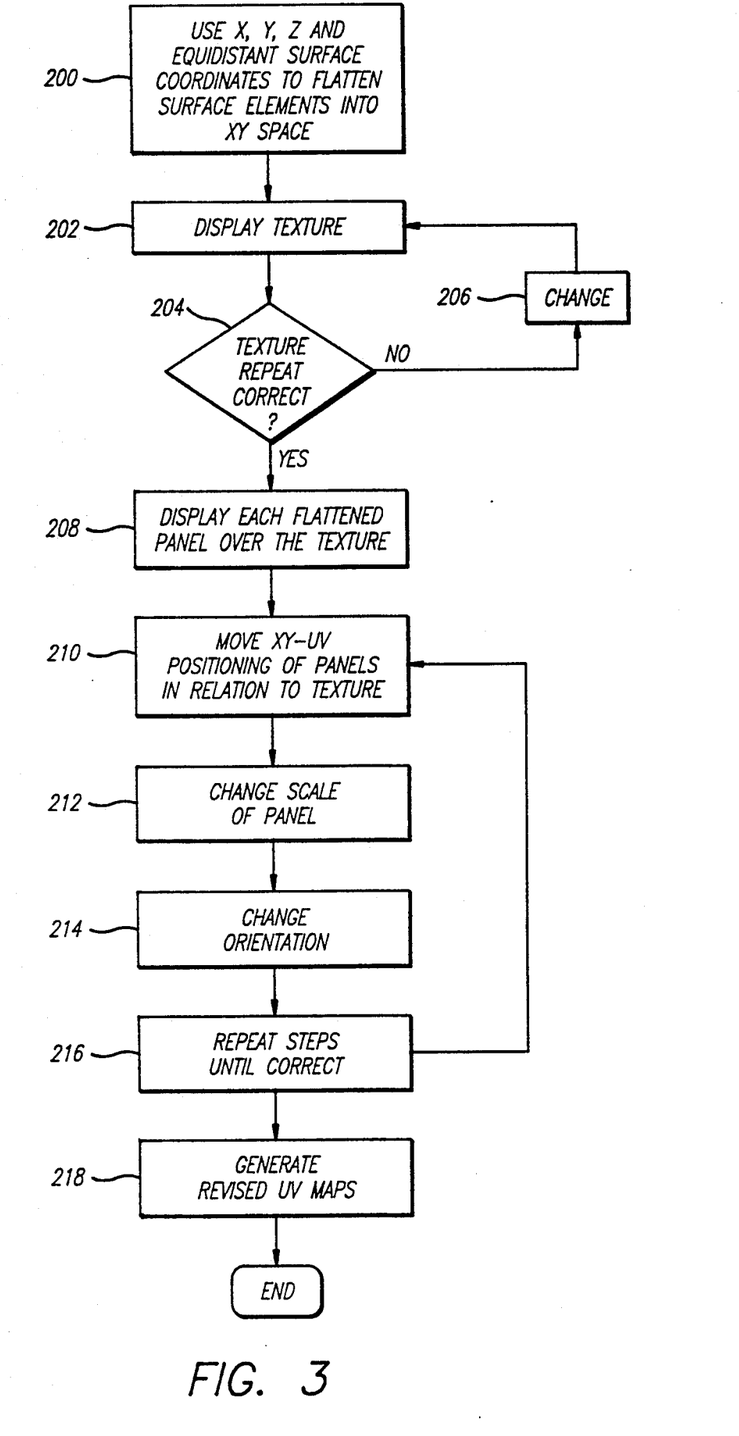
FIG. 3 is a functional flow diagram of the coordinate setting feature of the present invention.

Referring now to FIG. 3, a further feature of the present invention allows a region of the canvas image to be "flattened" and viewed in the texture plane. This feature has particular utility in allowing an element of a garment pattern, e.g. a sleeve, to be viewed as it would actually be cut from the fabric. At step 200, the X,Y,Z coordinates of the defined region 16 are transformed to "flat" X,Y coordinates. In performing this operation, it is assumed that the material is inelastic; however, with suitable modifications, the actual physical properties of an elastic material may be incorporated into this step so that the resulting flattened panel takes into account any stretching of the material that occurs when it is "draped" over the modelled surface.

Steps 204, 204 and 206 permit the operator to alter a repeating texture pattern to achieve a more pleasing appearance in the fabric window 14. For example, it might be desired to change a design that repeats in a checkerboard pattern to one that repeats in a window pane pattern. The flattened panel corresponding to region 16 is next displayed in the texture or fabric window 14 at step 208. The operator may now adjust the position, orientation and scale of the flattened panel relative to the pattern of the texture at steps 210-216 until the desired appearance of the panel is achieved. When the operator has completed this process, the mapping functions are reset at step 218 and the end result may be viewed in perspective in the canvas window as described above.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. A method for adding surface texture to a computer generated two-dimensional image of a three-dimensional object comprising the steps of:
   (a) generating said two-dimensional image of said three-dimensional object on a first computer screen,
   (b) defining a region with bounding polylines on said two-dimensional image of said object,
   (c) generating a two-dimensional image of said surface texture on a second computer screen,
   (d) defining first and second non-contiguous polygonal areas with bounding polylines of said two-dimensional image of said surface texture,
   (e) defining first and second polygonal areas with bounding polylines within said defined region corresponding to said first and second polygonal areas defined in step (d),
   (f) computing a mathematical model of said defined region by:
      (i) calculating initial mappings between vertices of the first and second polygonal areas defined in step (d) and corresponding vertices of the respective first and second polygonal areas defined in step (e);
      (ii) calculating a mapping function for each of a plurality of sample points within said defined region by interpolating said initial mappings;
      (iii) smoothing the mapping function for each of said plurality of sample points by integrating the corresponding mapping functions of a plurality of neighboring sample points;
   (g) mapping said surface texture onto said defined region in accordance with said mathematical model, and
   (h) generating a textured image of said defined region on said first computer screen.

2. The method of claim 1 wherein the polygonal area defined in step (e) approximately corresponds to an orthographic projection of the polygonal area defined in step (d) onto said object.

3. The method of claim 2 wherein said mathematical model defines said defined region in two dimensions.

4. The method of claim 2 wherein said mathematical model defines said defined region in three dimensions.

5. The method of claim 4 further comprising the step of defining an approximate tilt direction of said polygonal area defined in step (e).

6. The method of claim 1 wherein said first and second computer screens are displayed simultaneously.

7. The method of claim 1 further comprising the step of computing lighting normals for said defined region for the purpose of artificially illuminating said two-dimensional image of said three-dimensional object.

8. The method of claim 4 further comprising the step of generating a two-dimensional panel corresponding to the shape of said defined region when flattened.

9. The method of claim 8 further comprising the step of displaying said said two-dimensional panel superimposed on said surface texture.

10. The method of claim 9 further comprising the step of modifying texture coordinates by adjusting a position of said two-dimensional panel relative to said surface texture.

11. A method for constructing a three-dimensional mathematical model of an object comprising the steps of:
   (a) generating a two-dimensional image of said object;
   (b) defining first and second non-contiguous reference polygons with bounding polylines in a reference plane;
   (c) defining first and second non-contiguous polygonal areas with bounding polylines on said two-dimensional image approximately corresponding to an orthographic projection of said first and second reference polygons onto said object;
   (d) computing a transformation between each of a plurality of vertices on each of said reference polygons and corresponding vertices in three dimensions on said approximate orthographic projection of said each of said reference polygons;
   (e) calculating a mapping function for each of a plurality of sample points on said image of said object by interpolating said transformations;
   (f) smoothing the mapping function for each of said plurality of sample points by integrating the corresponding mapping functions of a plurality of neighboring sample points.

12. The method of claim 11 further comprising the step of defining an approximate tilt direction of said approximate orthographic projection of said reference polygon.

13. The method of claim 11 wherein a plurality of reference polygons and corresponding polygonal areas on said two-dimensional image are defined and wherein a plurality of respective transformations are computed and further comprising the step of interpolating respective transformations associated with proximately disposed polygonal areas to compute a transformation for a point on said two-dimensional image lying between said proximately disposed polygonal areas.

* * * * *

UNITED STATES PATENT AND TRADEMARK OFFICE
CERTIFICATE OF CORRECTION

PATENT NO. : 5,333,245
DATED : July 26, 1994
INVENTOR(S) : Vecchione

It is certified that error appears in the above-identified patent and that said Letters Patent is hereby corrected as shown below:

at column 5, line 59, equation (14), change

"" $b_n = a_n * \{ (X_{n+1} - X_n)^2 + (Y_{n+1} - Y_n)^2 \} - (X_n - X_{n-1})^2 - (Y_n - Y_{n-1})$ ""

to

-- $b_n = a_n * \{ (X_{n+1} - X_n)^2 + (Y_{n+1} - Y_n)^2 \} - (X_n - X_{n-1})^2 - (Y_n - Y_{n-1})^2$ -- at column 7, line 8, equation (27), change

"" $\text{distance} =$ $\sqrt{((\partial U/\partial X)*(X_P-X_A)+(\partial U/\partial Y)*(Y_P-Y_A))^2 + ((\partial V/\partial X)*(X_P-X_A)+(\partial V/\partial Y)*(Y_P-Y_A))}$ $+ \sqrt{((\partial U/\partial X)*(X_P-X_B)+(\partial U/\partial Y)*(Y_P-Y_B))^2 + ((\partial V/\partial X)*(X_P-X_B)+(\partial V/\partial Y)*(Y_P-Y_B))}$ $- \sqrt{((\partial U/\partial X)*(X_A-X_B)+(\partial U/\partial Y)*(Y_A-Y_B))^2 + ((\partial V/\partial X)*(X_A-X_B)+(\partial V/\partial Y)*(Y_A-Y_B))}$ ""

to

UNITED STATES PATENT AND TRADEMARK OFFICE
CERTIFICATE OF CORRECTION

PATENT NO. : 5,333,245
DATED : July 26, 1994
INVENTOR(S) : Vecchione

It is certified that error appears in the above-indentified patent and that said Letters Patent is hereby corrected as shown below:

-- distance =

$$\frac{1}{\sqrt{((\partial U/\partial X)*(X_P-X_A)+(\partial U/\partial Y)*(Y_P-Y_A))^2+((\partial V/\partial X)*(X_P-X_A)+(\partial V/\partial Y)*(Y_P-Y_A))^2}}$$

$$+ \sqrt{((\partial U/\partial X)*(X_P-X_B)+(\partial U/\partial Y)*(Y_P-Y_B))^2+((\partial V/\partial X)*(X_P-X_B)+(\partial V/\partial Y)*(Y_P-Y_B))^2}$$

$$- \sqrt{((\partial U/\partial X)*(X_A-X_B)+(\partial U/\partial Y)*(Y_A-Y_B))^2+((\partial V/\partial X)*(X_A-X_B)+(\partial V/\partial Y)*(Y_A-Y_B))^2} \quad --$$

Signed and Sealed this

Eighteenth Day of April, 1995

BRUCE LEHMAN

*Commissioner of Patents and Trademarks*

*Attest:*

*Attesting Officer*